US007814351B2

(12) United States Patent
Lubbers et al.

(10) Patent No.: US 7,814,351 B2
(45) Date of Patent: Oct. 12, 2010

(54) POWER MANAGEMENT IN A STORAGE ARRAY

(75) Inventors: Clark Edward Lubbers, Colorado Springs, CO (US); David Peter DeCenzo, Pueblo, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 592 days.

(21) Appl. No.: 11/770,672

(22) Filed: Jun. 28, 2007

(65) Prior Publication Data

US 2009/0006877 A1   Jan. 1, 2009

(51) Int. Cl.
*G06F 1/32* (2006.01)
*G06F 1/26* (2006.01)

(52) U.S. Cl. .................. 713/300; 713/310; 713/320; 713/321; 713/322; 713/323; 713/324; 713/330; 713/340; 711/6; 711/114

(58) Field of Classification Search ................. 713/300, 713/310, 320–324, 330, 340; 711/6, 114
See application file for complete search history.

(56) References Cited

U.S. PATENT DOCUMENTS

| | | | |
|---|---|---|---|
| 5,666,538 A | 9/1997 | DeNicola | |
| 7,143,203 B1 * | 11/2006 | Altmejd | 710/16 |
| 7,281,088 B2 * | 10/2007 | Yamazaki et al. | 711/114 |
| 7,337,334 B2 * | 2/2008 | Kuhlmann et al. | 713/300 |
| 2001/0011374 A1 * | 8/2001 | Lerman et al. | 725/92 |
| 2003/0023719 A1 * | 1/2003 | Castelli et al. | 709/224 |
| 2004/0163000 A1 * | 8/2004 | Kuhlmann et al. | 713/300 |
| 2005/0268121 A1 * | 12/2005 | Rothman et al. | 713/300 |
| 2008/0080131 A1 * | 4/2008 | Hori et al. | 361/685 |
| 2008/0109665 A1 * | 5/2008 | Kuhlmann et al. | 713/300 |
| 2008/0259710 A1 * | 10/2008 | Wenzel et al. | 365/226 |

\* cited by examiner

*Primary Examiner*—Abdelmoniem Elamin
(74) *Attorney, Agent, or Firm*—McCarthy Law Group

(57) ABSTRACT

A data storage system and associated method is provided within an enclosure supporting a self-contained plurality of discrete data storage devices configured for connecting with a network device via a network. The data storage system includes a redundant array of independent drives (RAID) container services module in the enclosure that allocates and manages a storage space of the data storage devices for storing primary and redundant data, and a policy engine in the enclosure that continuously and qualitatively characterizes the network load to the data storage system and manages a power distribution to each of the data storage devices based on a predicted utilization that differentiates between access commands for primary data and access commands for redundant data.

18 Claims, 8 Drawing Sheets

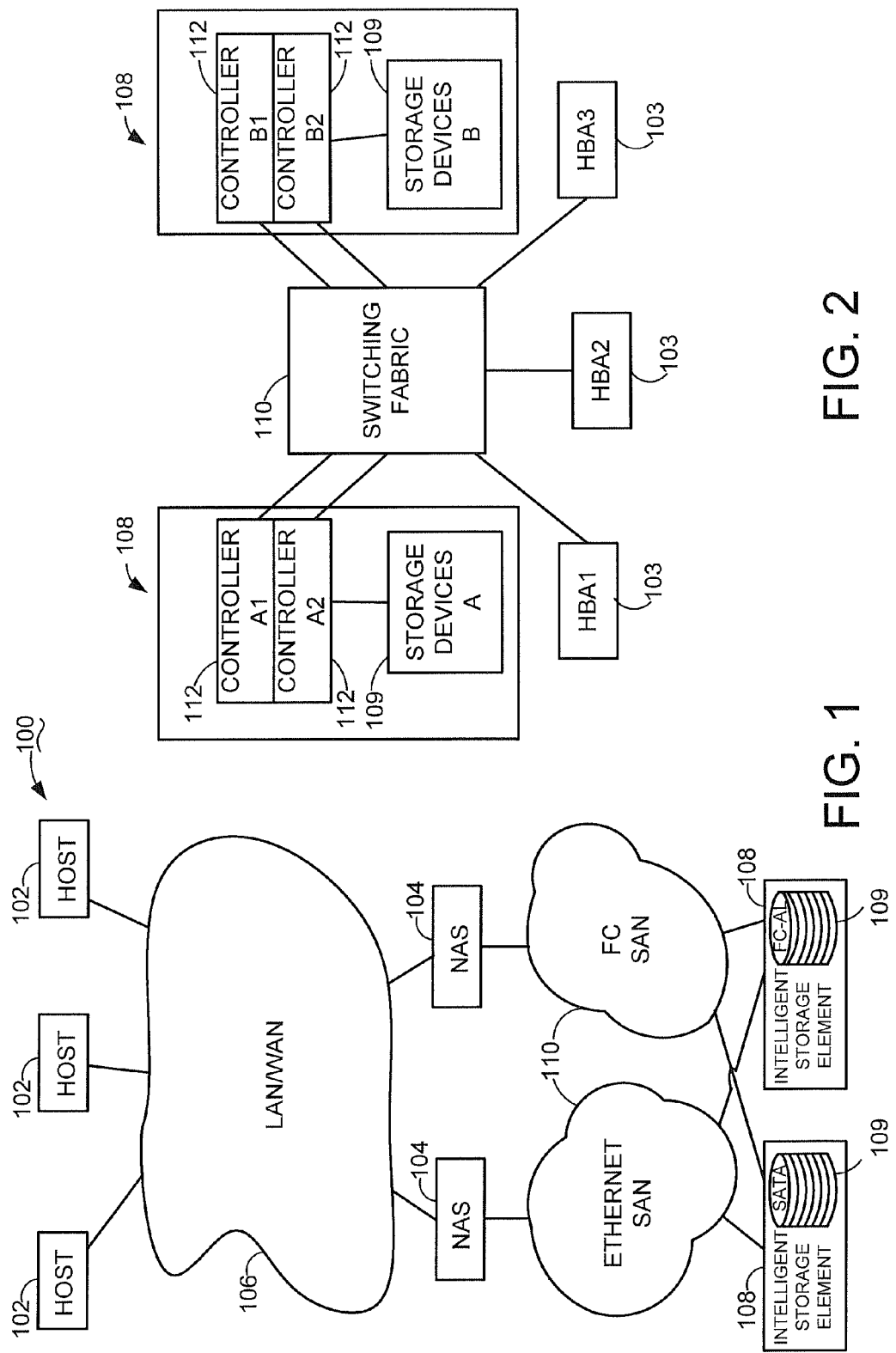

POWER MANAGEMENT IN A STORAGE ARRAY

FIELD OF THE INVENTION

Embodiments of the present invention relate generally to the field of data storage systems and more particularly, but not by way of limitation, to an apparatus and method for adaptively managing power consumption in an array storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, the manner of storing data may need to be adapted to accommodate bursts of unusual host load activity. What is needed is an intelligent data storage subsystem that self-deterministically allocates, manages, and protects its respective data storage capacity and presents that capacity as a virtual storage space to the network to accommodate global storage requirements. This virtual storage space is able to be provisioned into multiple storage volumes. It is to this solution that embodiments of the present invention are directed.

SUMMARY OF THE INVENTION

Embodiments of the present invention are generally directed to power management in a storage array portion of a distributed storage system.

In some embodiments a data storage system is provided in an enclosure supporting a self-contained plurality of discrete data storage devices configured for connecting with a network device via a network. The data storage system includes a redundant array of independent drives (RAID) container services module in the enclosure that allocates and manages a storage space of the data storage devices for storing primary and redundant data, and a policy engine in the enclosure that continuously and qualitatively characterizes the network load to the data storage system and manages a power distribution to each of the data storage devices based on a predicted utilization that differentiates between access commands for primary data and access commands for redundant data.

In some embodiments a method is provided for managing power in a pool of data storage devices. The method includes placing the pool of data storage devices in a common enclosure with a policy engine in the enclosure capable of characterizing network access commands; monitoring time of day information for access commands to each data storage device differentiated between access commands for RAID primary data as opposed to access commands for RAID redundant data; calculating a statistical record of the actual utilization of each data storage device in the pool from the monitoring step findings; and predicting future utilizations of each data storage device from results of the calculating step.

In some embodiments a data storage system is provided having a multiple device array (MDA) under the control of a self-contained storage processor for communicating access commands between data storage devices of the MDA and a network device via a network, and means for managing power to each of the data storage devices in the MDA by predicting future RAID utilizations from data collected about actual utilizations.

These and various other features and advantages which characterize the claimed invention will become apparent upon reading the following detailed description and upon reviewing the associated drawings.

BRIEF DESCRIPTION OF THE DRAWINGS

FIG. 1 is a diagrammatic representation of a computer system incorporating embodiments of the present invention.

FIG. 2 is a simplified diagrammatic representation of a portion of the computer system of FIG. 1.

DETAILED DESCRIPTION

Figure 3:
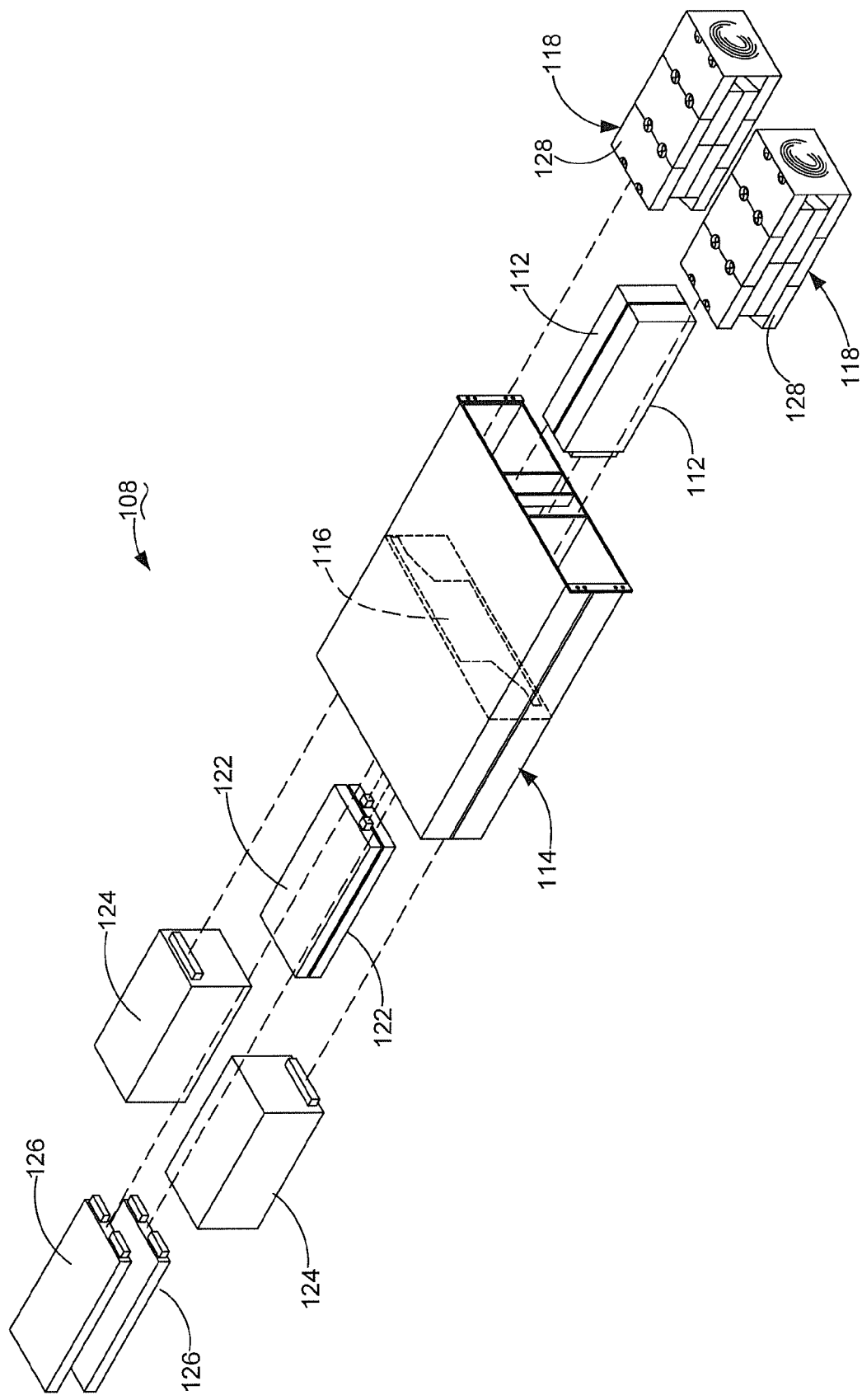
FIG. 3 is an exploded isometric view of an intelligent storage element constructed in accordance with embodiments of the present invention.

FIG. 1 is an illustrative computer system 100 incorporating embodiments of the present invention. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements (ISE) 108. Accordingly, SANs 110 connect the servers 104 to the ISEs 108 for access to the stored data. The ISEs 108 provide a data storage capacity 109 for storing the data over various selected communication protocols such as serial ATA and fibre-channel, with enterprise or desktop class storage medium within.

FIG. 2 is a simplified diagrammatic view of part of the computer system 100 of FIG. 1. Three host bus adapters (HBA) 103 are depicted interacting with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). That is, the controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

FIG. 3 illustrates an ISE 108 constructed in accordance with illustrative embodiments of the present invention. A shelf 114 defines cavities for receivingly engaging the controllers 112 in electrical connection with a midplane 116. The shelf 114 is supported, in turn, within a cabinet (not shown). A pair of multiple drive assemblies (MDAs) 118 are receivingly engageable in the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

Figure 4:
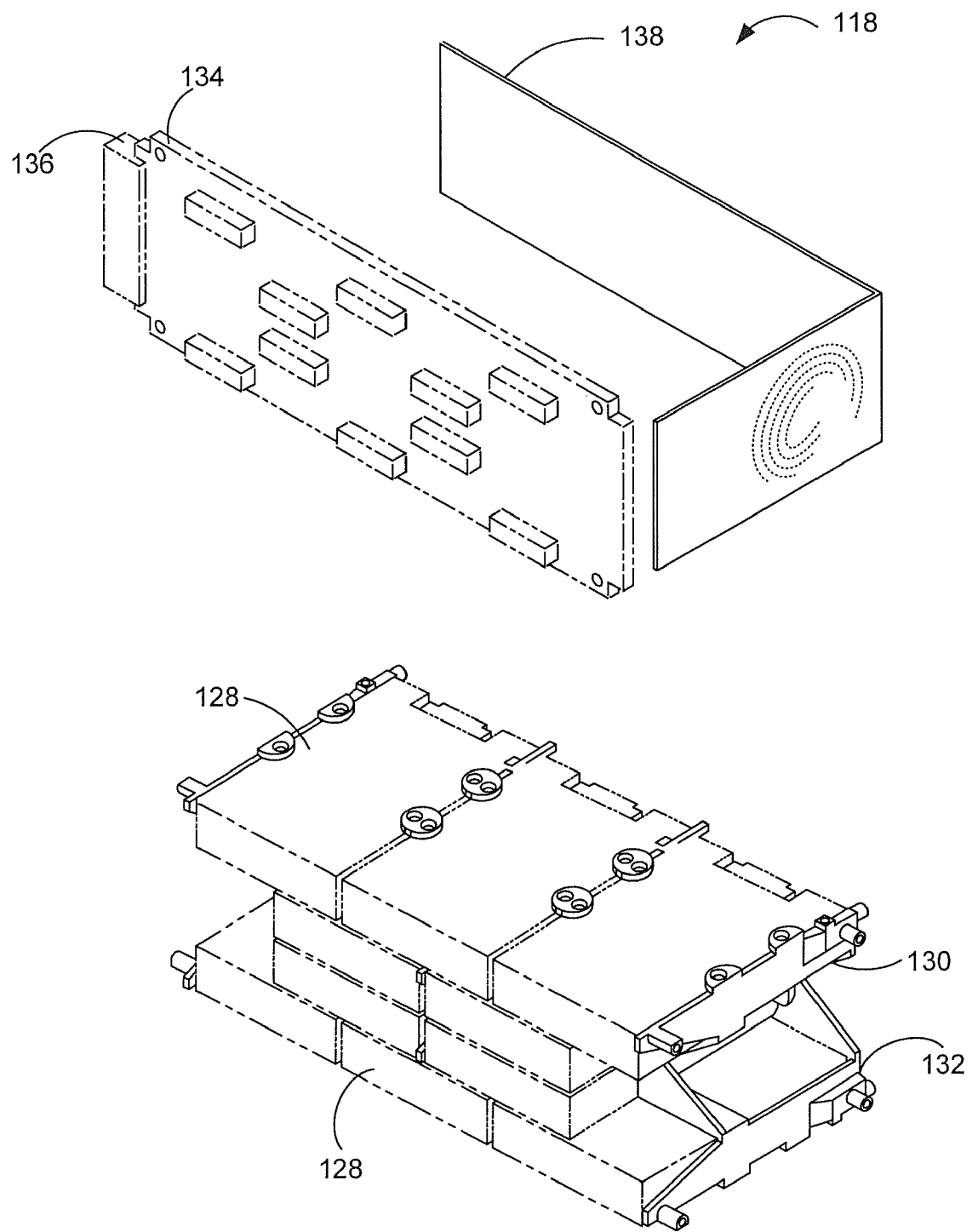
FIG. 4 is an exploded isometric view of a multiple drive array of the intelligent storage element of FIG. 3.

FIG. 4 is an enlarged exploded isometric view of the MDA 118 which has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of U.S. Pat. No. 7,133,291 entitled Carrier Device and Method for a Multiple Disc Array which is assigned to the assignee of the present invention and incorporated herein by reference. Another illustrative embodiment of the MDA 118 is the subject matter of U.S. Pat. No. 7,177,145 of the same title which is also assigned to the assignee of the present invention and incorporated herein by reference. In alternative equivalent embodiments the MDA 118 can be provided within a sealed enclosure.

Figure 5:
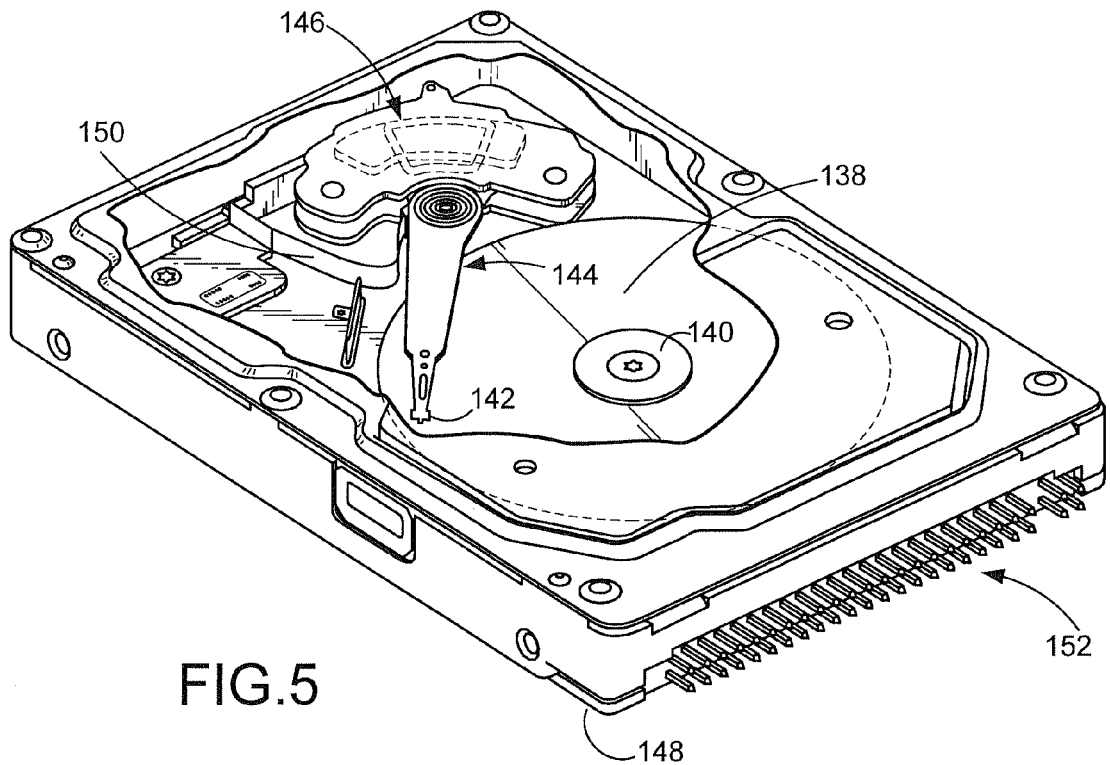
FIG. 5 is an exemplary data storage device used in the multiple drive array of FIG. 4.

FIG. 5 is an isometric view of a data storage device 128 suited for use with embodiments of the present invention and in the form of a rotating media disc drive. Although a rotating spindle with moving data storage medium is used for discussion purposes below, in alternative equivalent embodiments a non-rotating medium device, such as a solid state memory device is used. In the illustrative embodiments of FIG. 5 a data storage disc 138 is rotated by a motor 140 to present data storage locations of the disc 138 to a read/write head ("head") 142. The head 142 is supported at the distal end of a rotary actuator 144 that is responsive to a voice coil motor (VCM) 146 in moving the head 142 radially between inner and outer tracks of the disc 138. The head 142 is electrically connected to a circuit board 148 by way of a flex circuit 150. The circuit board 148 is adapted to receive and send control signals controlling the functions of the data storage device 128. A connector 152 is electrically connected to the circuit board 148, and is adapted for connecting the data storage device 128 with the circuit board 134 (FIG. 4) of the MDA 118.

Figure 6:
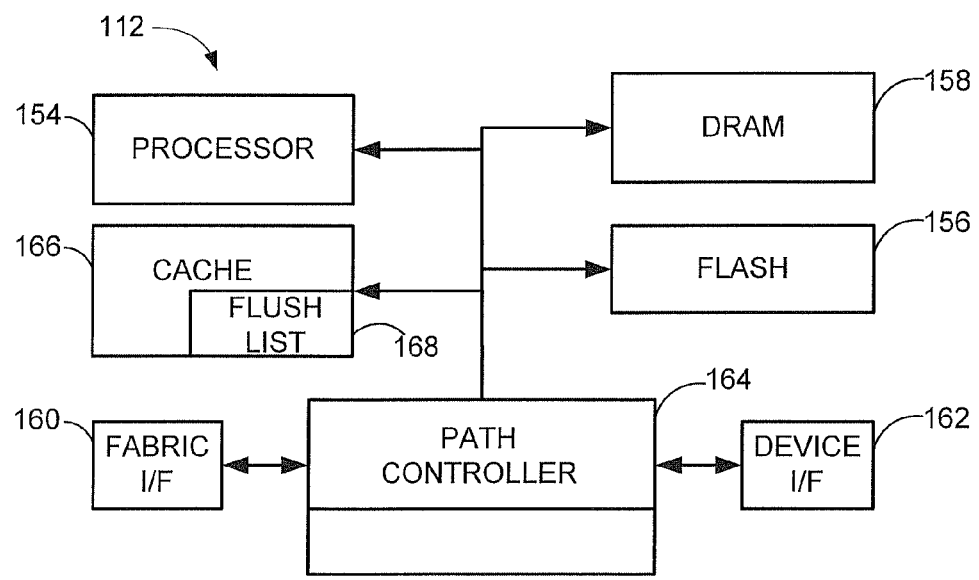
FIG. 6 is a functional block diagram of the array controller in the intelligent storage element.

FIG. 6 diagrammatically depicts one of the controllers 112. The controller 112 can be embodied in a single integrated circuit, or distributed among a number of discrete circuits as desired. A processor 154, preferably characterized as a programmable computer processor, provides control in accordance with programming steps and processing data preferably stored in non-volatile memory 156 (such as flash memory or similar) and in dynamic random access memory (DRAM) 158.

A fabric interface (I/F) circuit 160 communicates with the other controllers 112 and the HBAs 103 via the fabric 110, and a device I/F circuit 162 communicates with the storage devices 128. The I/F circuits 160, 162 and a path controller 164 form a communication path to pass commands and data between network devices and the ISE 108 via the HBAs 103, such as by employing the cache 166. Although illustrated discretely, it will be understood that the path controller 164 and the I/F circuits 160, 162 can be unitarily constructed.

Preferably, in order to increase host processing performance, write commands to virtual blocks are writeback cached in the cache 166 and held as pending therein until a cache manager activates flushing activities for particular subsets of write commands by requesting RAID container services (RCS) to flush virtual blocks to the storage devices 128. RCS executes algorithms that pass requests to perform specific data transfers to seek managers in order to effect the update of media in accordance with RAID algorithms that reliably update media. A seek manager manages a command queue for a specific storage device 128 to, in effect, grant permissions to issue data transfer requests which are derived from cached writeback commands and higher priority host read commands. The seek manager allocates resources for performing the associated data transfers that, in effect, grants permissions to issue the transfer requests.

The data storage capacity of an ISE 108 is organized into logical devices that are referenced when storing data to and retrieving data from the drives 128. System configuration information defines the relationship between user data as well as any associated parity and mirror data and the respective storage locations. The system configuration information furthermore identifies the relationship between blocks of storage capacity allocated to data and the associated memory storage locations, such as in terms of logical block addresses (LBA). The system configuration information can furthermore include virtualization by defining virtual block addresses that are mapped to logical block addresses.

The controller 112 architecture advantageously provides scalable, highly functional data management and control of the storage capacity. Preferably, stripe buffer lists (SBLs) and other metadata structures are aligned to stripe boundaries on the storage media and reference data buffers in cache 166 that are dedicated to storing the data associated with a disk stripe during a storage transaction.

During operation, the cache 166 will store user data and other information associated with I/O transfers through the HBAs 103 via the SAN 110. Readback data retrieved from the storage devices 128, including non-requested speculative data, may be retained for a time in the cache 166 in hopes of a subsequent "cache hit," so that the subsequently requested data are forwarded directly from the cache 166 instead of requiring the scheduling of an access command directed to the storage devices 128. Similarly, a writeback cache policy is employed so that data to be written to the storage devices 128 is cached, a completion acknowledgement is sent back to the initiating network device via the HBA 103, but the actual writing of the data to the storage device 128 is scheduled at a later convenient time.

It is thus generally necessary for the controller 112 to maintain accurate control of the contents of the cache 166, including tracking the status of each entry. Such control is preferably carried out by way of a skip list arrangement which utilizes an address related table structure. The skip list is preferably maintained in a portion of the cache 166, although other memory spaces can be utilized as desired.

The cache 166 is managed on a node basis by the controller 112 using a data structure referred to as a stripe data descriptor (SDD). Each SDD holds data concerning recent and current accesses to the data with which it is associated. Each SDD preferably aligns to a corresponding RAID stripe (i.e., all of the data on a selected storage device associated with a particular parity set), and conforms to a particular stripe buffer list (SBL).

Each cache node managed by the controller 112 preferably references some particular SDD, with active SDD structures for a given set of logical discs being preferably linked in ascending order via a virtual block address (VBA) using forward and backward linked lists. Each SDD also preferably includes variables that indicate various states of the data, including access history, locked status, last offset, last block, timestamp data (time of day, TOD), identifiers to which zone (book) the data belong, and RAID level employed. Preferably, writeback ("dirty" data) status of the data associated with the SDD is managed in relation to dirty data, dirty buffer, dirty LRU and flushing LRU values.

Preferably, the VBA values are aligned with the RAID data organization using a grid system sometimes referred to as a RAID Allocation Grid System (RAGS). Generally, any particular collection of blocks belonging to the same RAID strip (e.g., all of the data contributing to a particular parity set) will be assigned to a particular reliable storage unit (RSU) on a particular sheet. A book consists of a number of sheets and is constructed from multiple contiguous sets of blocks from different storage devices. Based on the actual sheet and VBA, the books can be further sub-divided into zones, indicating the particular device or device set (when redundancy is employed).

Preferably, the controller 112 concurrently operates to manage the writeback data processes at a number of different levels, depending on system requirements. A first level generally involves the periodic flushing of full SDD structures when a full RAID strip is detected. This can be readily carried out for a given SDD based on the RAID level variable when the SDD identifies the associated data as dirty. Preferably, this involves a backward inspection to determine if enough consecutive adjacent SDD structures are sufficiently full of dirty data. If so, these SDD strictures are placed in the command queue and a request is made to commence flushing of the data.

Flushing smaller sets of data are preferably handled on an SDD basis. Any SDD with dirty blocks and no locked blocks are preferably set as dirty LRU and sorted by age (e.g., time the data has spent in the cache waiting flushing). Once a particular aging is reached, the flushing LRU variable is preferably set and the command queue is updated. When a particular range of consecutive dirty blocks is scheduled for flushing, the controller 112 will preferably locate other ranges of dirty blocks based on the RAID level that have proximate locality; that is, blocks that are "nearby" such as in terms of seeking time or that involve access to the same RAID parity strip.

In accordance with the present embodiments, the aggressiveness of the flushing of data from the command queue is tied to the host load of I/O commands. That is, not flushing aggressively enough during a relatively high host load can cause the cache 126 to reach saturation. Conversely, flushing too aggressively during a relatively low host load can negatively impact the latency of host read requests. Both scenarios adversely affect ISE 108 system performance.

Figure 7:
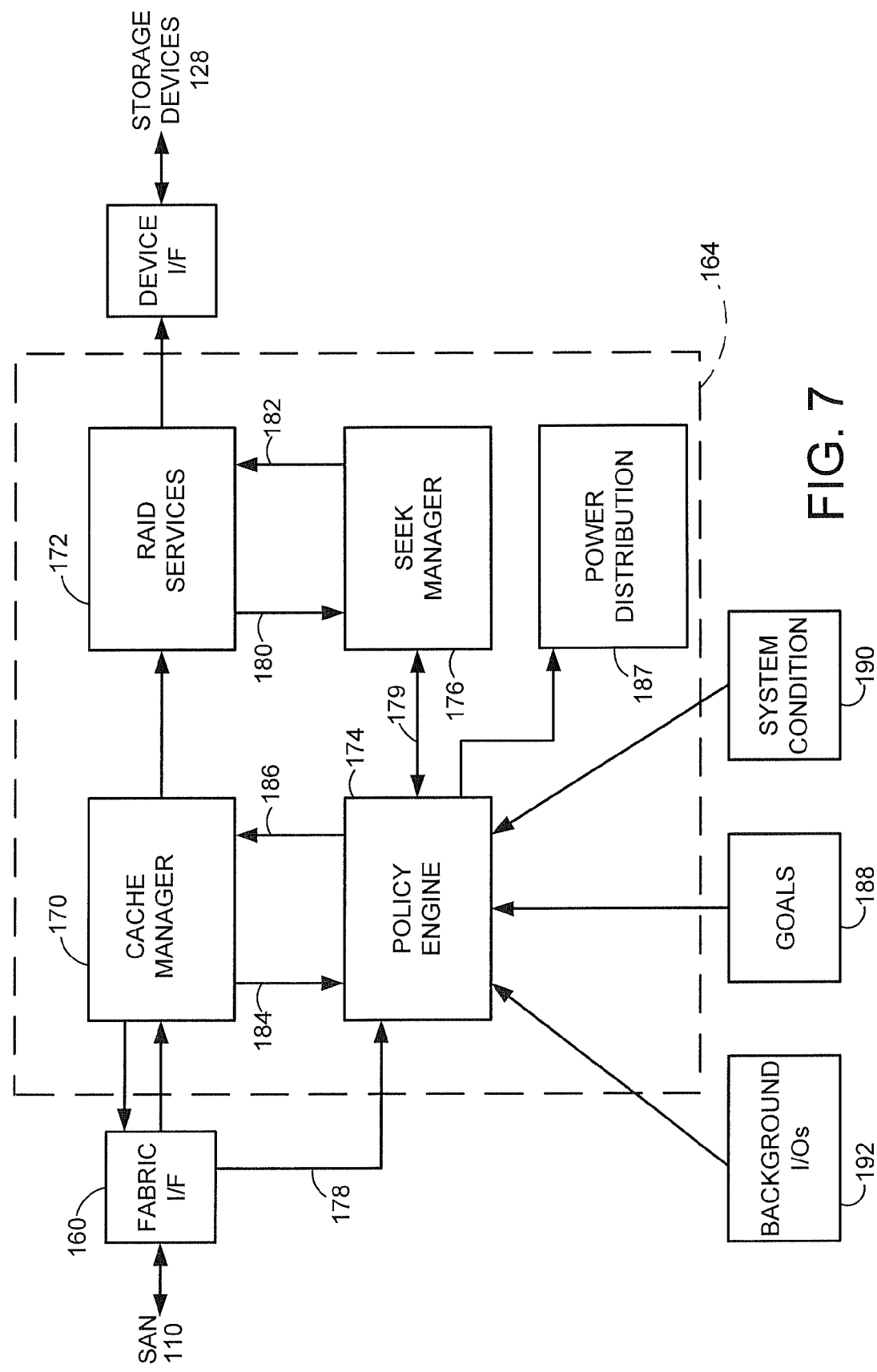
FIG. 7 is a functional block diagram of a portion of the array controller in the intelligent storage element.

FIG. 7 is a functional block diagram depicting a cache manager 170, a RAID container services module 172, a policy engine 174, and a seek manager 176 that reside in the path controller 164 (FIG. 6). Although only one seek manager 176 is depicted, there is a dedicated seek manager 176 for each data storage device 128 so that they are individually responsive to rules from the policy engine 174.

These functional blocks can exist in software or hardware, in the latter such as but not limited to the policy engine 174 being a finite state machine. In any event, the policy engine 174 continuously collects qualitative data about access commands received via the fabric I/F 160 on an I/O-by-I/O basis via path 178. The policy engine 174 dynamically characterizes the host load and consequently issues rules via path 179 that govern the seek manager 176 which, in turn, queries a command queue of data transfer requests derived from requests to flush writeback data and host read commands via path 180 and selectively grants permissions to issue data transfer requests via path 182 to define a command profile. The policy engine 174 also stays continuously apprised of the cache 166 state via path 184 and can likewise issue rules to the cache manager via path 186.

The policy engine 174 can collect quantitative data about the load in real time, such as the current rate of I/O commands coming from one or more network requesting devices. The policy engine 174 can also collect qualitative data about the load in order to dynamically characterize the load and continuously send rules to the cache manager 170 and/or the seek manager 176 to adjust the seek profile to the data storage devices 128 in relation to the characterization.

For example, the policy engine 174 can collect real time data characterizing the network load in terms of the ratio of rate sensitive commands to latency sensitive commands, in an environment where writeback caching is presumed. Writeback cache commands are considered to be rate sensitive commands because it does not matter so much which requests are flushed to the data storage devices 128 at any point in time. In fact, rate sensitive requests may even be overwritten while pending in cache 166 as dirty data. What matters is that rate sensitive commands get flushed at a rate that prevents the cache 166 from reaching saturation. On the other hand, a host access command to read data that is stored in one or more of the data storage devices 128 will likely cause the host application to block further processing until the access command is satisfied. The time it takes to satisfy the access command, the latency period, is critical to the performance of the application. Such commands are thereby referred to as the latency sensitive commands. In certain circumstances the host can opt to not authorize writeback caching. In that case a write command, called a write through cache command, is likewise categorized as a latency sensitive command.

The present embodiments contemplate the policy engine 174 further characterizing the read access commands and write access commands in terms of timestamp statistics, or in other words the day and time of day that the access commands were received by the ISE 108. Collecting the timestamp information permits the policy engine 174 to correlate the load characterization to an actual utilization of each storage device 128 in the ISE 108, with respect to access commands for primary data differentiated from access commands for redundant data. Statistical regression of the timestamp information enables the policy engine 174 to predict future projected utilizations of each storage device 128. The projected utilizations are used to generate rules governing a power distribution module 187 which controls the powering on and off of each of the storage devices 128 individually, or collectively in appropriate groupings of the storage devices 128. That is, the policy engine 174 predicts future intervals of nonutilization of a data storage device independently of the network. When the predicted interval is greater than a preselected interval the policy engine 174 governs to power distribution module 187 to reduce power to the nonutilized data storage device.

Note that in addition to these characterizations, the policy engine 174 can also collect qualitative data characterizing the host load in other terms such as but not limited to the size of the associated data file (bandwidth), the HBA 103 and/or network device initiating the access command, storage device 128 access history or any part thereof such as in terms of book access history, RAID class, and the LUN class to which the access command is directed.

In collecting qualitative data the policy engine 174 preferably tallies counts during each of a predetermined sample interval, such as but not limited to each one-second interval. The one-second intervals are collectively observed over relatively long periods and statistically analyzed, such as with respect to mean and standard deviation. A free running counter can be set with a pointer moving the index on one-second boundaries to continuously track the values of desired metrics such as the number of read commands, the number of write commands, and bandwidth of the commands. The counter holds a desired number of previously observed ratios, such as the previous 15 minutes of one-second sample ratios. On the one second boundaries the index cycles, subtracts the indexed historical value and adds the latest sample value, then statistically analyzes the most recent running average.

The policy engine 174 can be responsive to performance goals 188 in formulating rules for the cache manager 170, the seek manager 176, and the power distribution 187. The goals 188 can be quantitative or qualitative, such as but not limited to dynamically setting the threshold interval against which predicted non-utilizations are compared in deciding whether to power down one or more storage devices 128. The threshold is likely to vary with system demands for performance, such as it being more risky to power down storage devices 128 during times when the ISE 108 is predicted to experience a high load of write commands in a saturated state.

Additionally, the policy engine 174 can be responsive to system condition information 190 in formulating rules. For example, without limitation, a power supply indicator may inform the policy manager 174 that the ISE 108 has switched to a battery backup power source. In this condition the policy manager 174 will likely implement contingencies to aggressively flush the cache 166 with respect to the projected limited power availability. The policy engine 174 can also be responsive to the state of pending background I/Os 192, or I/Os not directly involved with access command data transfers, in formulating the rules.

Figures 8, 9:
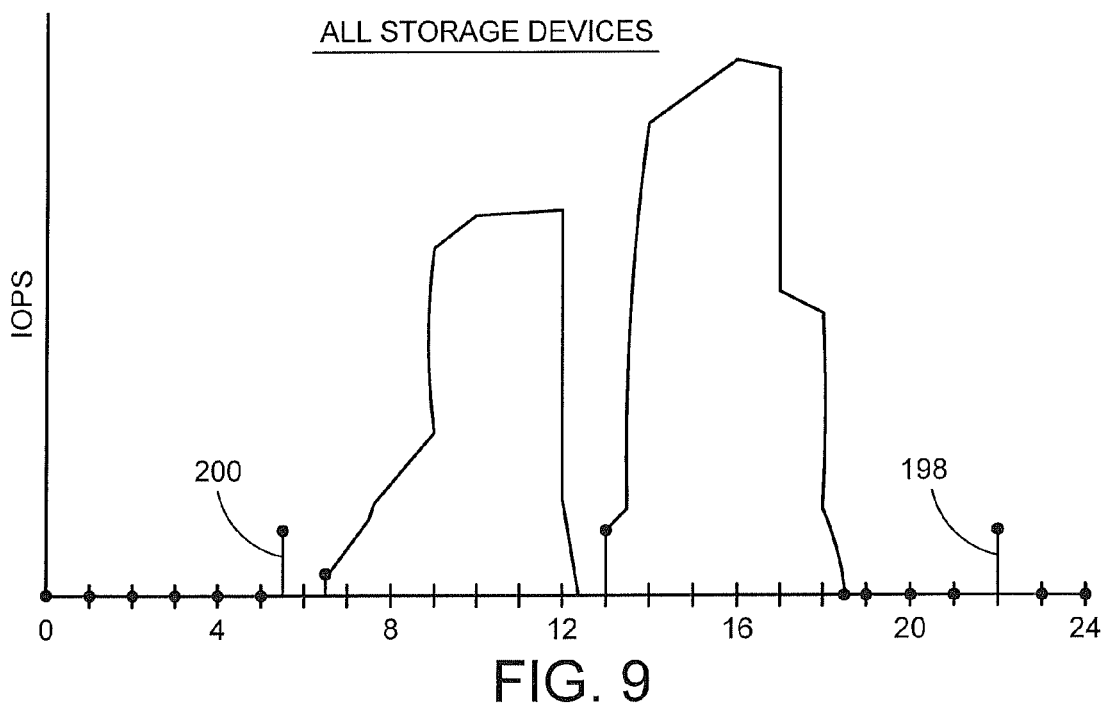
FIG. 8 is an array depicting the allocation of storage devices in the intelligent storage element in a paired drive RAID-1 arrangement.
FIG. 9 is a chart of historical data collected by the policy engine for the utilization of all storage devices during a 24 hour interval.

Turning now to focus on the power management aspects of the present embodiments, FIG. 8 is an array depicting an illustrative allocation of eight storage devices 128 denoted "A" through "H" into eight books $196_1$ through $196_8$ of storage capacity. Allocation and management of the storage capacity for storing primary and redundant data is governed by the RAID services module 172. The policy engine 174 queries the RAID services module 172 via path 191 for allocation status, in order to identify opportunities to power down non-utilized sources of redundant data. In the illustrative embodiments the storage devices 128 are allocated for storing data in a "paired mirroring" RAID-1 arrangement. That is, the user data (primary data) denoted "D1" is stored in book 1 of storage devices A, B, C, and D and mirrored (redundant data) in the same book but in storage devices E, F, G, and H and denoted "M1."

FIG. 9 depicts observed network load activity on all of the storage devices for a 24 hour period of a given day. The collected data can be characterized in any way useful, such as by combining the data for each day of the week, or combining working days together and weekends and holidays together, or even individually tracking calendar days from previous years' activities.

From the data it is immediately recognizable that the policy engine can heuristically predict some relatively long intervals of non-utilization of all the storage devices 128 outside the hours of 0730 and 1730. If, for example, a policy engine 174 rule is that a storage device 128 will be powered down for any projected non-utilization of 15 minutes or more, then an opportunity for powering all the storage devices 128 occurs at about 1945 until about 2200, when a low frequency command activity 198 is predicted to occur. Following that event, another opportunity to power down all the storage devices 128 occurs from about 2215 until about 0530 when the reduced power mode is again interrupted by a low frequency activity event denoted 200. Note that other opportunities for powering down all the storage devices appear after the event 200 and before about 0730, aid from about 1230 and 1300.

The policy engine 174 is capable of parsing the statistical characterization to identify further opportunities for reducing power to the ISE 108. For example, it is assumed that the characterization indicates that the low frequency event 198 involves only storage device A and the low frequency event 200 involves only storage devices A and B. Therefore, the policy engine 174 can, based on the predicted non-utilizations, govern the power distribution 187 to power down all the storage devices except for A and its mirror counterpart E in anticipation of the event 198, and likewise to power down all the storage devices except for A and B and their mirror counterparts E and F in anticipation of the event 200.

In circumstances such as these the policy engine 174 can also migrate data if the opportunity presents itself for further power reduction. For example, the data associated with the event 200 could be migrated to only one storage device 128 to cut in half the number of storage devices 128 necessary to support the access command activity. Furthermore, the policy engine 174 can store regular but low frequency events in cache 166 or in another pool of storage devices 128 so that none of the storage devices 128 would be interrupted from the reduced power state.

Figure 10:
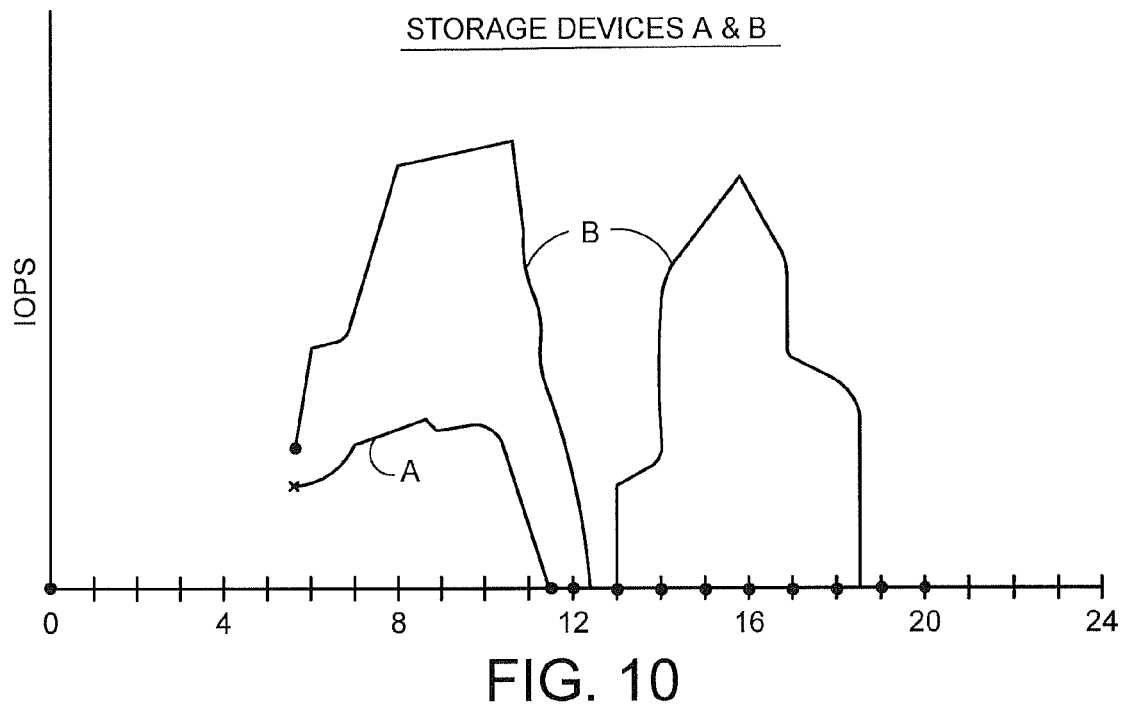
FIG. 10 is a chart similar to FIG. 9 but depicting the individual utilizations of storage devices A and B.

Furthermore, during the period of expected utilization (0730 to 1830) the policy engine 174 analyzes the network load for each storage device 128 and issues rules to power them on and off individually. For example, FIG. 10 is a chart of observed utilization similar to that of FIG. 9 but for just storage devices A and B. Note that a prediction of non-utilization for storage device A can be made after about 1300 for the duration of the period of otherwise expected utilization. Based on this information the policy engine 174 can power storage device A down according to this projected non-utilization.

Figure 11:
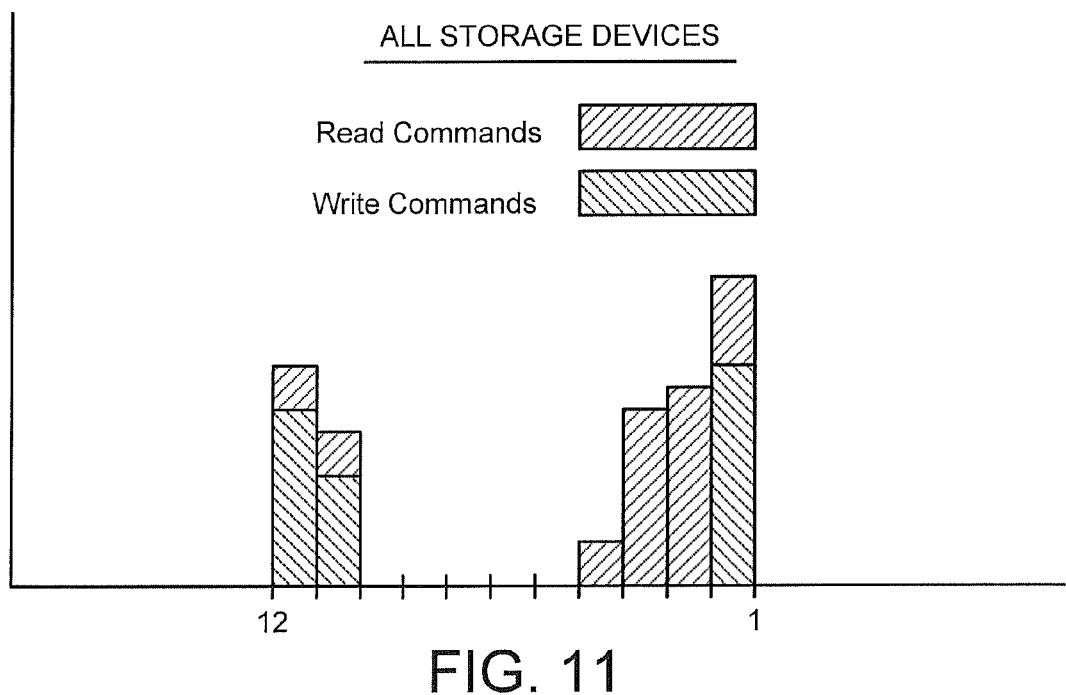
FIG. 11 is a detail of a portion of the chart of FIG. 9 depicting the ratio of read commands to write commands during a period of projected utilization.

The policy engine 174 can further issue rules based on projected intervals of utilization but during which the mirror data is likely not needed. For example, FIG. 11 is an enlarged detail of the data of FIG. 9 between 1200 and 1300, shown in a stacked bar graph depicting the subsets of read commands and write commands received. It is noted that following the non-utilization period ending at 1230, a 15 minute interval is projected during which only read commands are received. Because no mirror writes are necessary during this interval, and assuming other indicators such as from the system condition 190 and seek manager 176 are within expectations, then the policy engine 174 can advantageously leave half of the storage devices 128 (the mirror storage devices E, F, G, and H) powered down even though it is a period of projected utilization of the counterpart storage devices A, B, C, and D.

Figure 12:
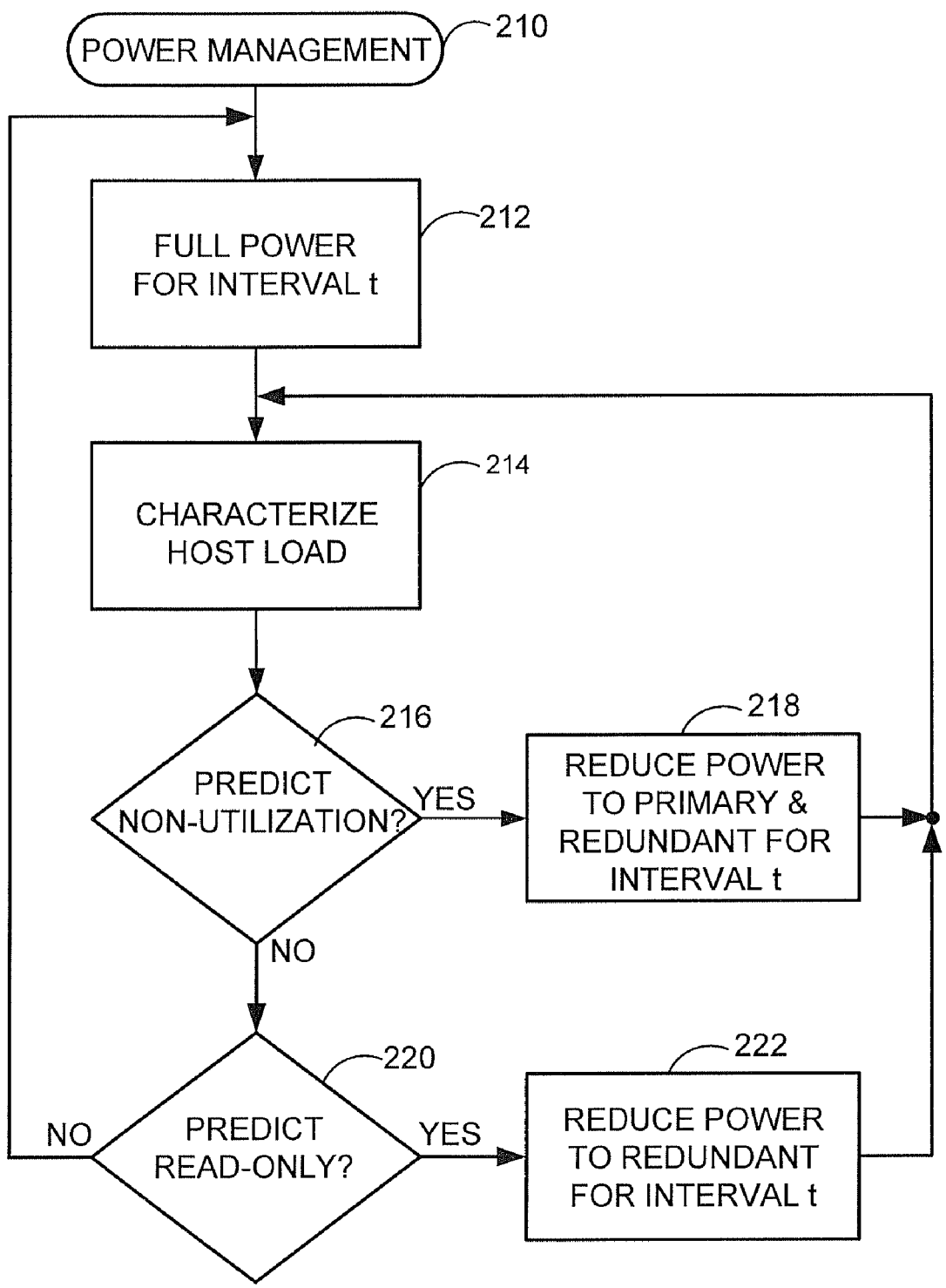
FIG. 12 is a flowchart depicting steps in a method for POWER MANAGEMENT in accordance with embodiments of the present invention.

FIG. 12 is a flowchart depicting steps in a method 210 for POWER MANAGEMENT in accordance with embodiments of the present invention. The method 210 begins at block 212 where the policy engine invokes a default mode of powering all the storage devices for a predetermined interval t, such as but not limited to an interval of 15 minutes, during which the policy engine collects data regarding the network load. The latest data is used in block 214 to dynamically characterize the host load, such as in terms of the read to write ratio and I/O rate.

In block 216 the policy engine 174 statistically analyzes collected data regarding the utilizations of the storage devices 128 and determines whether any are presently predicted to be non-utilized for an interval greater than a threshold. The threshold value is provided by the policy engine as well, and it may vary in relation to different operating conditions as indicated by information from the goals 188, system condition 190, and background I/Os 192. If the determination of block 216 is yes, then in block 218 power is managed, such as being reduced or turned off to both the primary and redundant storage devices 128 in the paired mirror arrangement for an interval t, during which the policy engine 174 collects the next batch of host load data. The policy engine 174 invokes rules for managing the power, but preferably the power is stepped down incrementally, such as from full power mode to standby power mode to sleep mode to power down mode, depending on the length of the predicted interval.

If the determination of block 216 is no, then in block 220 the policy engine 174 determines from the statistical analysis of collected data whether any of the storage devices 128 are predicted to be utilized but in a read-only mode for an interval greater than a threshold. Again, rules defining the threshold and the levels with which the power is reduced is governed by the policy engine 174. If the determination of block 220 is yes, the power is reduced or turned off to the redundant storage device 128 in block 222 for an interval t, during which the policy engine 174 collects the next batch of host load data. If the determination of block 220 is no then control returns to block 212 and default conditions persist.

Generally, the present embodiments contemplate a data storage system having an MDA under the control of a self-contained storage processor for executing access commands between data storage devices of the MDA and a network device via a network, and means for managing power to each of the data storage devices in the MDA by predicting utilizations from data collected about actual utilizations. For purposes of this description and meaning of the appended claims the phrase "means for managing" expressly includes the structure disclosed herein and equivalents thereof that permit the controller 112 to characterize the network load and directly adjust the power supplied to the MDA according to the characterization.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A data storage system comprising:
an enclosure supporting a self-contained plurality of discrete data storage devices configured for connecting with a network device via a network;
a redundant array of independent drives (RAID) container services module in the enclosure that allocates and manages a storage space of the data storage devices for storing primary and redundant data; and
a policy engine in the enclosure that continuously and qualitatively characterizes the network load to the data storage system and manages a power distribution to each of the data storage devices based on a predicted utilization that differentiates between access commands for primary data and access commands for redundant data.

2. The data storage system of claim 1 wherein the policy engine maintains a statistical record of an observed number of access commands for the primary data as differentiated from access commands for the redundant data to each of the data storage devices during a predetermined interval.

3. The data storage system of claim 1 wherein the policy engine predicts future intervals during which a data storage device is statistically likely to be nonutilized independently of the network, and when a predicted interval is greater than a predetermined threshold governs a power distribution module to reduce a power mode of the data storage device.

4. The data storage subsystem of claim 1 wherein the policy engine characterizes the load in terms of what access commands are read commands in real time.

5. The data storage subsystem of claim 1 wherein the RAID container services module allocates the data storage devices into a primary data device and a mirror data device paired mirroring arrangement for storing data with a RAID-1 fault tolerance, and wherein the policy engine predicts intervals during which the primary data device is statistically likely to receive only read commands, and reduces a power mode of the mirror data device when a predicted read-only command interval is greater than a predetermined threshold.

6. The data storage subsystem of claim 1 wherein the policy engine identifies low frequency access command activity that interrupts a reduced power mode state, and transfers the data blocks associated with the low frequency activity to consolidate identified low frequency command activity to a single data storage device.

7. The data storage subsystem of claim 6 wherein the policy engine transfers the data blocks associated with the low frequency access command activity to cache.

8. The data storage subsystem of claim 1 wherein the policy engine comprises a finite state machine.

9. A method for managing power in a pool of data storage devices, comprising:
- placing the pool of data storage devices in a common enclosure with a policy engine in the enclosure capable of characterizing network access commands;
- monitoring time of day information for access commands to each data storage device differentiated between access commands for RAID primary data as opposed to access commands for RAID redundant data;
- calculating a statistical record of the actual utilization of each data storage device in the pool from the monitoring step findings;
- predicting future utilizations of each data storage device from results of the calculating step.

10. The method of claim 9 further comprising allocating the data storage devices in a RAID independently of the storage area network.

11. The method of claim 9 wherein the monitoring step comprises maintaining a statistical record of an observed number of the differentiated access commands to each of the data storage devices during a predetermined interval.

12. The method of claim 9 wherein the predicting step comprises predicting, independently of the network, future intervals during which a data storage device is statistically expected to be nonutilized with respect to RAID redundant data, and when a predicted nonutilization interval is greater than a predetermined threshold reducing a power mode of the data storage device.

13. The method of claim 9 wherein the monitoring step comprises ascertaining what portion of the access commands are read commands and the calculating step comprises calculating a read-only mode utilization of the data storage devices.

14. The method of claim 10 wherein the allocating step comprises providing a paired mirroring arrangement of primary data storage devices and respective mirror data storage devices with RAID-1 fault tolerance, wherein the predicting step comprises projecting a future interval during which the primary data storage device is statistically expected to be only in a read-only utilization mode, further comprising reducing a power mode of the respective mirror storage device when the projected future interval is greater than a predetermined threshold.

15. The method of claim 9 wherein the monitoring step identifies low frequency access command activity interrupting a reduced power mode state, and in response transfers the data blocks associated with the low frequency access command activity to consolidate them in a single data storage device.

16. The method of claim 15 wherein the transferring step comprises transferring the data blocks associated with the low frequency access command activity to a selected one of another data storage device in the pool and another data storage device outside the pool.

17. The method of claim 16 wherein the transferring step comprises transferring the data blocks associated with the low frequency access command activity to cache.

18. The method of claim 9 wherein the monitoring step is characterized by time of day information in terms of at least one of a number of read commands, a number of write commands, a read bandwidth, and a write bandwidth.

* * * * *